Figure 1:
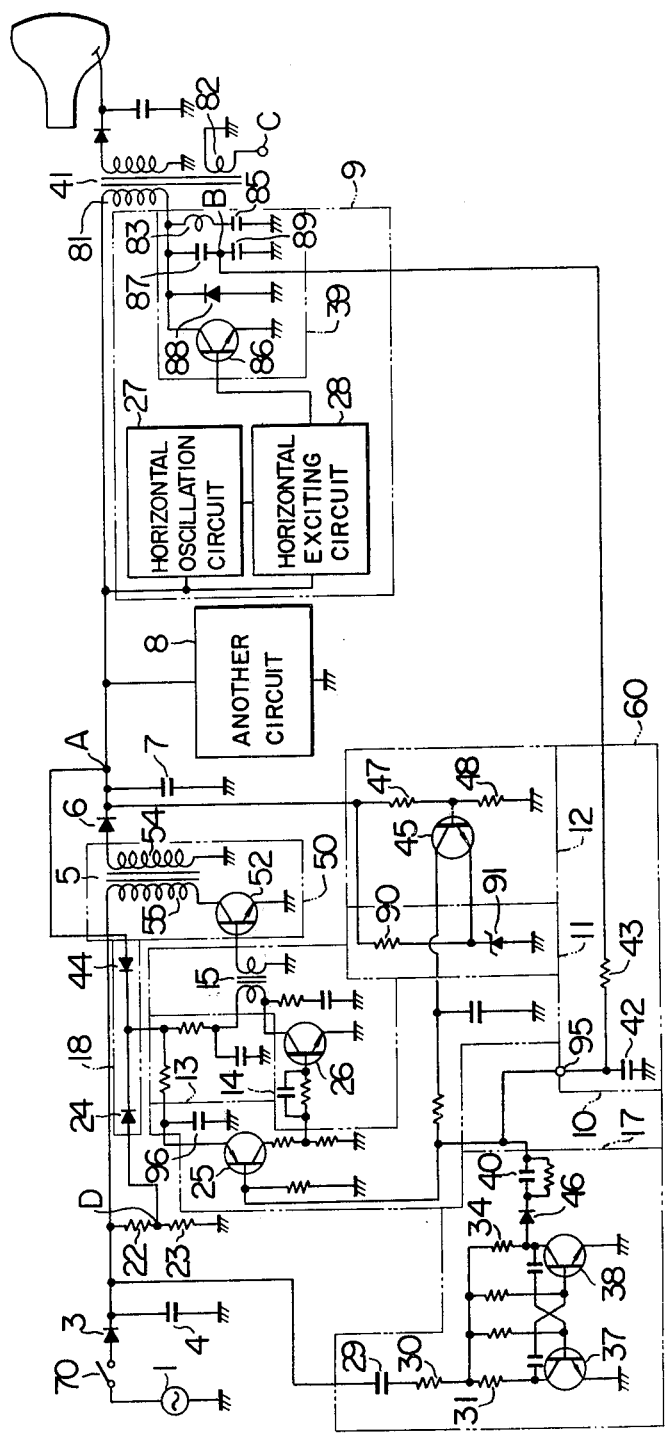

United States Patent [19]

Umehara

[11] 4,118,739

[45] Oct. 3, 1978

[54] SWITCHING REGULATOR FOR TELEVISION RECEIVER FOR GENERATING A STABILIZED D.C. SUPPLY VOLTAGE FOR OPERATING THE VARIOUS TV CIRCUITS

[75] Inventor: Kunio Umehara, Yokohama, Japan

[73] Assignee: Hitachi, Ltd., Japan

[21] Appl. No.: 769,834

[22] Filed: Feb. 17, 1977

[30] Foreign Application Priority Data

Feb. 20, 1976 [JP] Japan ................................ 51-17065
Feb. 20, 1976 [JP] Japan ................................ 51-17067

[51] Int. Cl.$^2$ ............................................. H04N 5/44
[52] U.S. Cl. ............................................... 358/190
[58] Field of Search ......................................... 358/190

[56] References Cited

U.S. PATENT DOCUMENTS 3,873,846  3/1975  Morio et al. ............... 358/190 X

OTHER PUBLICATIONS

Mullard Technical Communications No. 127, Jul. 1975, pp. 258-279.

*Primary Examiner*—Robert L. Richardson
*Attorney, Agent, or Firm*—Craig & Antonelli

[57] ABSTRACT

A switching regulator for a television receiver, wherein a non-stable dc voltage is periodically interrupted at the horizontal frequency by a chopper and the dc voltage obtained as the output of the chopper is applied to the horizontal output circuit. Flyback pulses generated by the horizontal output circuit are integrated to generate a saw-tooth waveform, and the dc component of the saw-tooth waveform is varied in accordance with the variation of the dc voltage delivered by the chopper. The duty ratio of the chopper is changed according to the variation of the dc component of the saw-tooth waveform.

9 Claims, 3 Drawing Figures

SWITCHING REGULATOR FOR TELEVISION RECEIVER FOR GENERATING A STABILIZED D.C. SUPPLY VOLTAGE FOR OPERATING THE VARIOUS TV CIRCUITS

This invention relates to a switching regulator for a television receiver and more particularly to a switching regulator in which the switching operation is performed at the horizontal frequency.

In the U.S. Pat. No. 3,819,986, a switching regulator for a television receiver is disclosed wherein a non-stabilized dc voltage is passed through a chopper and then rectified to be applied to a load circuit such as a horizontal oscillation circuit, and wherein an oscillator is incorporated in a control circuit for controlling the chopper, to which trigger pulses obtained by differentiating an output signal of the horizontal oscillation circuit are applied. According to this switching regulator, at the time when a power switch is closed, i.e., at the starting time, a non-stable dc voltage is applied through a capacitor to load circuits such as a horizontal oscillation circuit, a horizontal exciting circuit and a control circuit so that these circuits are temporarily actuated to cause the chopper to operate. The above circuits are then operated continuously by a dc voltage obtained at the output of the chopper due to the temporary actuation of the circuits. Such a type of regulator is advantageous in comparison with a regulator wherein the control circuit is always operated by a non-stabilized dc voltage, in that the load circuit such as the horizontal oscillation circuit, the horizontal exciting circuit and the control circuit are operated by a stabilized voltage after the starting of operation and that when the load is short-circuited the control circuit stops its operation and in turn the operation of the chopper is stopped. However, this regulator also has the following drawbacks.

Namely, it is difficult to obtain at the output of the horizontal oscillation circuit an oscillatory waveform stable against a temperature fluctuation so that the control on the basis of the non-stable oscillation waveform may cause the stabilized dc voltage to fluctuate in response to the temperature fluctuation.

Moreover, since the switching regulator still continues to operate even in the case of a fault such as short-circuiting of the horizontal output transistor, which frequently occurs, a large load current flows thereby destroying, one after the other, circuit components such as switching elements, etc., constituting the chopper.

Further, in order to operate the horizontal oscillation circuit, the horizontal exciting circuit and the control circuit, each having many elements, by a charging current transiently flowing into a capacitor at the time of starting, that capacitor must have a very large capacitance. Therefore, it is not practical to drive many circuits by a charging current flowing into a capacitor.

Furthermore, it is necessary for the horizontal oscillation circuit to have stable characteristics (e.g., oscillation frequency, oscillation waveform, horizontal pull-in range, synchronous holding region, etc.) against the change in the surrounding conditions such as temperature and humidity and disturbances such as noise, but since the oscillation circuit itself is sensitive to the change in surroundings, it is undesirable to directly couple the control circuit as a load to the horizontal oscillation circuit, because the horizontal oscillation circuit is adversely affected by the control circuit.

In addition, a regulator having in the control circuit an oscillator driven by trigger pulses at the time of normal operation, has its reliability lowered due to the presence of the oscillator. Therefore, it is desirable to make the oscillator unnecessary for the normal operation.

It is therefore an object of this invention to provide a switching regulator for a television receiver, which is prevented from operating when the generation of the flyback pulses is stopped due to a fault of, for example, the horizontal output transistor.

Another object of this invention is to provide a switching regulator whose control circuit is controlled by a signal having a stable waveform against temperature fluctuations.

Yet another object of this invention is to provide a switching regulator capable of being started without using a capacitor having a large capacitance.

According to this invention, for attaining the above objects, utilization is made of the horizontal flyback pulses generated by the horizontal output circuit. The control circuit receives as a control signal a signal in accordance with the output voltage of the chopper, and is also controlled by the flyback pulses, so that the duty ratio of the chopper is so controlled as to cause the chopper to deliver a constant output voltage. Moreover, the control circuit is supplied with a non-stable dc voltage applied to the chopper at the time of starting and with a stable dc voltage obtained at the output of the chopper after the starting.

According to this invention, there is provided a switching regulator for use in a television receiver, comprising: a dc power source for generating a non-stable dc voltage; a chopper which includes therein a switching element turned on and off alternately and which periodically interrupts the non-stable dc voltage in accordance with the turn-on and turn-off of the switching element; a rectifying means for reconverting a voltage obtained at an output of the chopper into a dc output voltage; a horizontal deflection circuit receiving the dc output voltage of the rectifying means; and a control circuit which receives a signal having the horizontal frequency from the horizontal deflection circuit, turns the switching element on and off at the horizontal frequency and controls the increase and decrease in the conduction period of the switching element in accordance with the decrease or increase in the dc output voltage, wherein the control circuit has means for responding to the horizontal flyback pulses generated by the horizontal output circuit in the horizontal deflection circuit.

Figure 2:
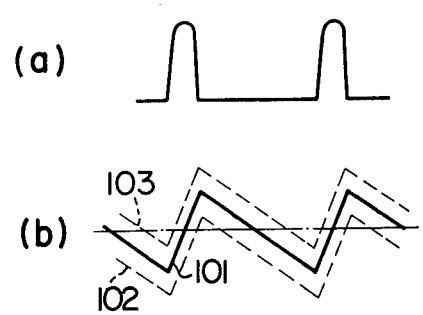
Figure 3:
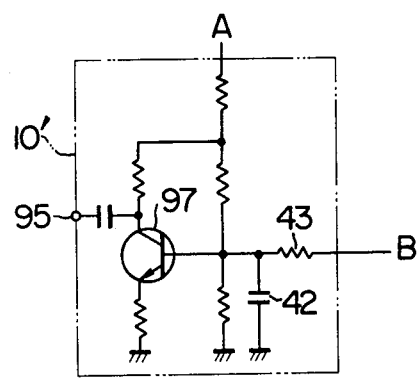

This invention will now be explained in detail with reference to the accompanying drawings in which:

FIG. 1 shows a circuit of a switching regulator according to an embodiment of this invention;

FIG. 2(a) and 2(b) show the voltage waveform of the horizontal flyback pulses and the saw-tooth waveform; and FIG. 3 shows another example of a waveform shaping circuit in FIG. 1.

Referring to FIG. 1, the ac voltage supplied from a commercial ac source 1 is rectified and smoothed into a non-stable dc voltage by means of a diode 3 and a capacitor 4. A transformer 5 and a transistor 52 constitute a chopper 50, the transistor 52 serving as a switching element turning on and off at the horizontal period. The combined circuit of a diode 6 and a capacitor 7 again rectifies and smoothes a voltage obtained at the output of the chopper, that is, a voltage induced across the secondary winding 54 of the transformer 5 and so a stabilized dc voltage is derived at a point A. A control circuit 60 controls the ratio of the conducting period to the cut-off period, i.e., the duty ratio of the transistor 52, to stabilize the dc voltage rectified and smoothed by the diode 6 and the capacitor 7. The stabilized dc voltage is applied not only to a horizontal deflection circuit 9 but also to another circuit 8 including therein a video circuit and a vertical deflection circuit. The horizontal deflection circuit 9 comprises a horizontal oscillation circuit 27, a horizontal exciting circuit 28 and a horizontal output circuit 39. The dc voltage to be applied to the horizontal output circuit 39 is supplied through the primary winding 81 of a flyback transformer 41. The horizontal output circuit 39 consists of a horizontal deflection coil 83, a capacitor 85 for compensating S distortion, series-connected capacitors 87 and 89 for resonance, a transistor 86 for horizontal output and a damper diode 88. At the junction point B of the capacitors 87 and 89 are obtained horizontal flyback pulses having an amplitude suitable to be supplied to a control circuit 60. The waveform of the horizontal flyback pulses, which is determined mainly by a resonance circuit consisting of the horizontal deflection coil 83 and the capacitors 87 and 89, is more stable against temperature fluctuation than the output waveform of the horizontal oscillation circuit 27 or exciting circuit 28. As shown in FIG. 1, the horizontal flyback pulses having a desired amplitude are obtained through the voltage division by the capacitors, but it is also possible to obtain horizontal flyback pulses having a desired amplitude from one end C of a suitable tertiary winding provided on the flyback transformer 41, as seen in FIG. 1. As described later, since this embodiment needs a signal having a large amplitude, the horizontal flyback pulses rather than the output of the horizontal oscillation circuit should be used to obtain such a signal having a large amplitude more easily.

A switch 18 consists of diodes 24 and 44 connected in reverse series with each other. At the time of start when the power switch 70 is turned on, the diode 24 is turned on to supply the non-stable dc voltage obtained as a result of voltage division by resistors 22 and 23, to a pulse width modulator 13 and an exciter 14 in the control circuit 60. Moreover, as described later, a starting circuit 17 also operates during a predetermined period at the time of starting so that the turn-on and turn-off of the transistor 52 alternate repeatedly. As a result, the chopper 5 delivers an output voltage and the voltage obtained by rectifying and smoothing the output voltage by the diode 6 and the capacitor 7, starts its rise from zero. When the dc voltage appearing at the junction point A exceeds the voltage appearing at the junction point D of the resistors 22 and 23, the diode 24 is turned off and the diode 44 is turned on. Once the diode 44 is turned on, the chopper 50 continues to operate so that a stabilized dc voltage is obtained at the junction point A. The provision of the switch 18 can reduce to a considerable extent the capacitance of a capacitor 60 through which the charging current flows at the time of starting.

A waveform shaper 10 is an integrating circuit consisting of a capacitor 42 and a resistor 43 and integrates the horizontal flyback pulses having a positive polarity as shown in FIG. 2(a) into a saw-tooth waveform as shown at numeral 101 in FIG. 2(b). The saw-tooth waveform obtained at an output terminal 95 is supplied to the base of a transistor 25 as the pulse width modulator 13 so as to alternately keep the transistor 25 in the cut-off state and the saturation state repeatedly. The amplitude of the horizontal flyback pulses supplied to the waveform shaper 10 is so chosen that the saw-tooth waveform may have an amplitude large enough to cause the change in the states of the transistor 25 instantaneously (e.g., 100 V in peak-to-peak value). The control of the duty ratio for stabilizing the dc voltage at the junction point A, is performed by controlling the dc level at the base of the transistor 25. A transistor 45 serving as an error detector 12 receives at its base the voltage obtained through the division of the dc voltage at the junction point A by resistors 47 and 48, and at its emitter a zener voltage from a reference voltage source 11 constituted of a resistor 90 and a zener diode 91 connected in series. Accordingly, the collector current of the transistor 45 increases or decreases according as the voltage at the junction point A increases or decreases. Consequently, the dc level at the base of the transistor 25 decreases or increases according as the dc voltage at the junction point A increases and decreases. Namely, the saw-tooth waveform supplied to the transistor 25 varies as indicated at numerals 102 and 103 in FIG. 2(b) in accordance with the dc voltage at the junction point A. Since a capacitor 96 is connected with the emitter of the transistor 25, the potential at the emitter of the transistor 25 is almost constant in the sense of ac voltage. On the other hand, the potential at the base of the transistor 25 varies as indicated in FIG. 2(b) in accordance with the dc level at the junction point A so that as the dc voltage at the junction point A increases, the conduction period of the transistor 25 is prolonged while the cut-off period thereof is shortened. Conversely, as the dc voltage at the junction point A decreases, the conduction period of the transistor 25 is shortened while the cut-off period thereof is prolonged. The transistor 26 in the exciter 14 is turned on and off in the same phase with the transistor 25 while the transistor 52 is turned on and off in the opposite phase relative to the transistors 25 and 26 since an exciting transformer 15 is connected in the opposite polarity. Consequently, according as the dc voltage at the junction point A increases or decreases, the above described duty ratio of the transistor 52 decreases or increases so that the dc voltage at the junction point A is maintained stable.

A starting circuit 17 has a differentiating circuit consisting of a capacitor 29 and a resistor 30 and an astable multivibrator consisting of resistors 31 and 34, transistors 37 and 38, etc. This astable multivibrator can be driven at a very small power so that it can be actuated temporarily (e.g., for 200 ms) by the charging current into the capacitor 29. To the oscillator of the astable multivibrator is applied a voltage obtained through the differentiation of the voltage rising upon closure of the power switch by the differentiating circuit of the capacitor 29 and the resistor 30. The astable multivibrator performs oscillating operation during a period determined according to the time constant depending upon the capacitor 29, the resistor 30 and the resistor 31 or 34. The output of the oscillator is divided by capacitors 40 and 42, applied to the base of the transistor 25 and further supplied to the transistor 52 through the modulator 13, the exciting circuit 14 and the exciting transformer 15, so that transistor 52 starts its switching operation. The voltage induced across the secondary winding 54 of the transformer 5 with the start of the switching operation is rectified and smoothed by the diode 6 and the capacitor 7 and then applied to the horizontal deflection circuit 9 constituted of the horizontal oscillation circuit 27, the horizontal exciting circuit 28 and the horizontal output circuit 39 and to another circuit 8. With the start of the operation of the horizontal deflection circuit 9, the pulse width modulator 13 begins to receive a saw-tooth waveform. When the ac voltage of the commercial power source 1 is lowered to a considerable extent at the time of normal operation, the dc voltage at the base of the transistor 25 rises largely so that there is an undesirable possibility that the oscillator of the starting circuit 17 operates. Therefore, a diode 46 is provided to prevent the erroneous operation of the oscillator.

In the embodiment of this invention shown in FIG. 1, the series circuit of the primary winding 55 of the transformer 5 and the switching element 52 is connected as the chopper 50 on the side of the non-stable dc voltage source so that intermittent dc voltage is generated across the secondary winding 54 of the transformer 5, but it is clear that this invention can also be applied to the circuits of such a type as the excess voltage protecting circuit, disclosed in the specification of the U.S. Pat. No. 3,819,986, in which the switching element is connected between the input and output terminals of the chopper so as to make and break the path between the input and the output terminals.

In the embodiment described above, the transistor 25 is rendered from its conducting state to its cut-off state during the horizontal flyback period and from its cut-off state to its conducting state during the horizontal scanning period, due to the saw-tooth waveform obtained by integrating the horizontal flyback pulses having positive polarity. Accordingly, the transistor 52 is turned from its conducting state to its cut-off state during the horizontal scanning period. When the transistor 52 changes from its conducting state to its cut-off state, an oscillating voltage is generated due to the stray inductance and the distributed capacitance between the primary and secondary windings 55 and 54 of the transformer 5. The oscillating voltage has so high a frequency that if the transistor 52 changes from its conducting state to its cut-off state within the horizontal scanning period, vertical striae sometimes appear on the screen of the picture tube. Namely, such a disturbance signal due to a high-frequency oscillating voltage is sometimes generated when the switching elements are rendered from its conducting state to its cut-off state in the case where a switching regulator is used in a television receiver. It is therefore customary in a television receiver using a conventional switching regulator that a clamp circuit or a damping circuit for preventing the generation of the h-f oscillating voltage is connected with inductive elements such as transformers.

However, according to the embodiment of this invention, in which the switching element is changed over from its conducting state to its cut-off state or conversely in the intermediate portion of the slope of the saw-tooth waveform obtained by integrating the horizontal flyback pulses and in which the duty ratio of the switching element is controlled in accordance with the dc level of the saw-tooth waveform, it is possible to cause the instant of the switching element changing from its conducting to cut-off state to lie within the horizontal flyback period and the instant of the element changing from its cut-off to conducting state to lie within the horizontal scanning period. Therefore, according to this invention, it is possible to cause the disturbance signal to appear within the horizontal flyback period so that the clamp circuit or the damping circuit may be eliminated. In the case of this embodiment of the invention, it is only necessary to provide in the waveform shaping circuit 10' a polarity inverting circuit, i.e., a transistor 97, for inverting the polarity of the saw-tooth waveform voltage obtained by integrating the horizontal flyback pulses having positive polarity, as shown in FIG. 3, or to supply horizontal flyback pulses having negative polarity to the waveform shaper 10. In this way, even if the polarity of the saw-tooth waveform shown in FIG. 2(b) is inverted, that is, even if the switching element is rendered from its conducting to cut-off state within the horizontal flyback period and from its cut-off to conducting state within the horizontal scanning period, a stabilized dc voltage is still obtained at the junction point A since the duty ratio of the switching element is controlled by the dc voltage at the junction point A.

What is claimed is:

1. A switching regulator for use in a television receiver, comprising:
    (a) a d.c. power source for generating a non-stabilized d.c. voltage;
    (b) chopper means including a switching element, said chopper means being operatively turned on and off alternately for periodically interrupting said non-stabilized d.c. voltage in accordance with the turn-on and turn-off of said switching element to produce an interrupted voltage;
    (c) rectifying means for converting the interrupted voltage from said chopper means into a d.c. output voltage;
    (d) a horizontal deflection circuit supplied as an operating voltage therefor with said d.c. output voltage for operatively generating a horizontal flyback pulse;
    (e) first control means supplied with said horizontal flyback pulse for generating a first control signal corresponding to the horizontal deflection frequency of said horizontal flyback pulse, and for preventing said first control signal from being generated when the supply of said horizontal flyback pulse is stopped; and
    (f) second control means for rendering said switching element on and off at said horizontal deflection frequency of said first control signal during the supply of said first control signal thereto and for holding said switching element inoperative during the stop of said first signal, said second control means including means supplied with said d.c. output voltage for generating a second control signal for operatively increasing or decreasing the on period of said switching element in accordance with the decrease or increase in level of said d.c. output voltage.

2. A switching regulator as claimed in claim 1, wherein said first control means comprises a waveform shaper for generating a voltage having a saw-tooth waveform as said first control signal by integrating said horizontal flyback pulses, and wherein said second control means comprises a first control circuit for generating said second control signal to change the d.c. level of said sawtooth voltage of said first control signal in accordance with the change in said d.c. output voltage, and a second control circuit for responding to the change in the d.c. level of said saw-tooth voltage of said first control signal and for controlling the ratio of the conduction period to the cut-off period of said switching element in such a manner that a change opposite to said change in said d.c. level of said first control signal of said saw-tooth voltage is generated.

3. A switching regulator as claimed in claim 2, wherein said second control circuit comprises a second switching element which has the ratio of its conduction to cut-off period changed in accordance with said change in said d.c. level of said saw-tooth voltage of said first control signal and which is turned on and off repeatedly at said horizontal deflection frequency of said first control signal, and means for causing said switching element to turn on and off in response to the turn-on and turn-off of said second switching element.

4. A switching regulator as claimed in claim 2, wherein said first control means includes an astable multivibrator operated by the build-up of said non-stabilized d.c. voltage at the time of starting and inoperative after the build-up of said non-stabilized d.c. voltage for supplying another pulse to said waveform shaper and wherein said second control circuit is supplied through a selective supply means with said non-stabilized d.c. voltage when said d.c. output voltage at the time of starting is not higher than a predetermined level and also said second control circuit is selectively supplied with said d.c. output voltage when said d.c. output voltage exceeds said predetermined level after said time of starting.

5. A switching regulator as claimed in claim 2, wherein said first control means includes means for causing said switching element to change from its on to off state within the horizontal flyback period and from its off to on state within the horizontal scanning period and said second control circuit includes means for causing the point of time at which said switching element changes from its off to on state, to lag or lead in accordance with the increases or decreases of said d.c. output voltage.

6. A switching regulator as claimed in claim 5, wherein said means for causing said switching element to change from its on to off state within the horizontal flyback period comprises a polarity inverting circuit for inverting the polarity of said saw-tooth waveform voltage of said first control signal.

7. A switching regulator as claimed in claim 1, wherein said first control means includes integration means for integrating said horizontal flyback pulse to generate a first control signal with a saw-tooth waveform voltage, and wherein said second control means comprises detection means supplied with said d.c. output voltage for producing a d.c. voltage signal as said second control signal whose level is responsive to that of said d.c. output voltage, and superposing means for superposing the saw-tooth waveform voltage of said first control signal on said d.c. voltage of said second control signal to form a superposed control voltage for application to said switching element to control the conduction period thereof.

8. A switching regulator as claimed in claim 7, wherein said second control means further comprises another switching element supplied with said superposed control voltage to be operatively rendered on and off at said horizontal deflection frequency, the ratio of the on to off periods of said another switching element being response to said d.c. voltage of said second control signal, and coupling means coupled between said switching element and said another switching element for causing said switching element to turn on and off in response to the turn-on and turn-off of said another switching element.

9. A switching regulator for use in a television receiver, comprising:
(a) a source for generating a non-stabilized d.c. voltage;
(b) a chopper comprising a transformer and a switching element connected in series with a primary winding of said transformer and with said source, a voltage being induced across a secondary winding of said transformer in response to the change to the conduction state and change to the cut-off state of said switching element;
(c) rectifying means for reconverting the voltage induced across the secondary winding of said transformer into a d.c. output voltage;
(d) a horizontal deflection circuit including a horizontal output circuit and connected with said rectifying means;
(e) detection means supplied with said d.c. output voltage from said rectifying means for generating a detection signal responsive to a level of said d.c. output voltage; and
(f) control means for causing said switching element to change from its conduction to cut-off state within a horizontal flyback period in accordance with the receipt of a horizontal flyback pulse from said horizontal output circuit and for causing said switching element to change from its cut-off to conduction state within the horizontal scanning period in accordance with said detection signal, the changing time period from the cut-off state to the conduction state of said switching element lagging or leading in accordance with said increase or decrease in said d.c. output voltage.

* * * * *